UNITED STATES PATENT OFFICE.

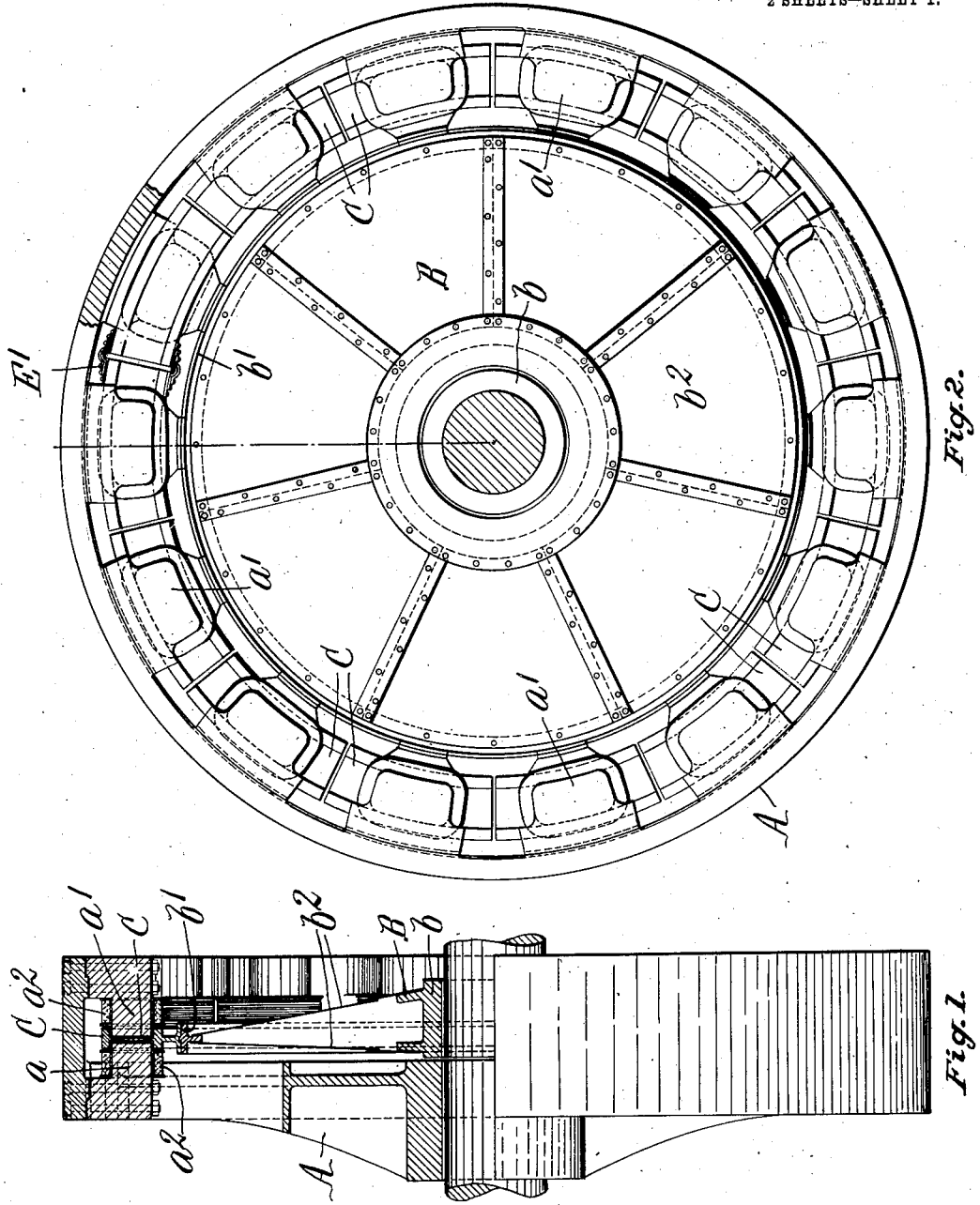

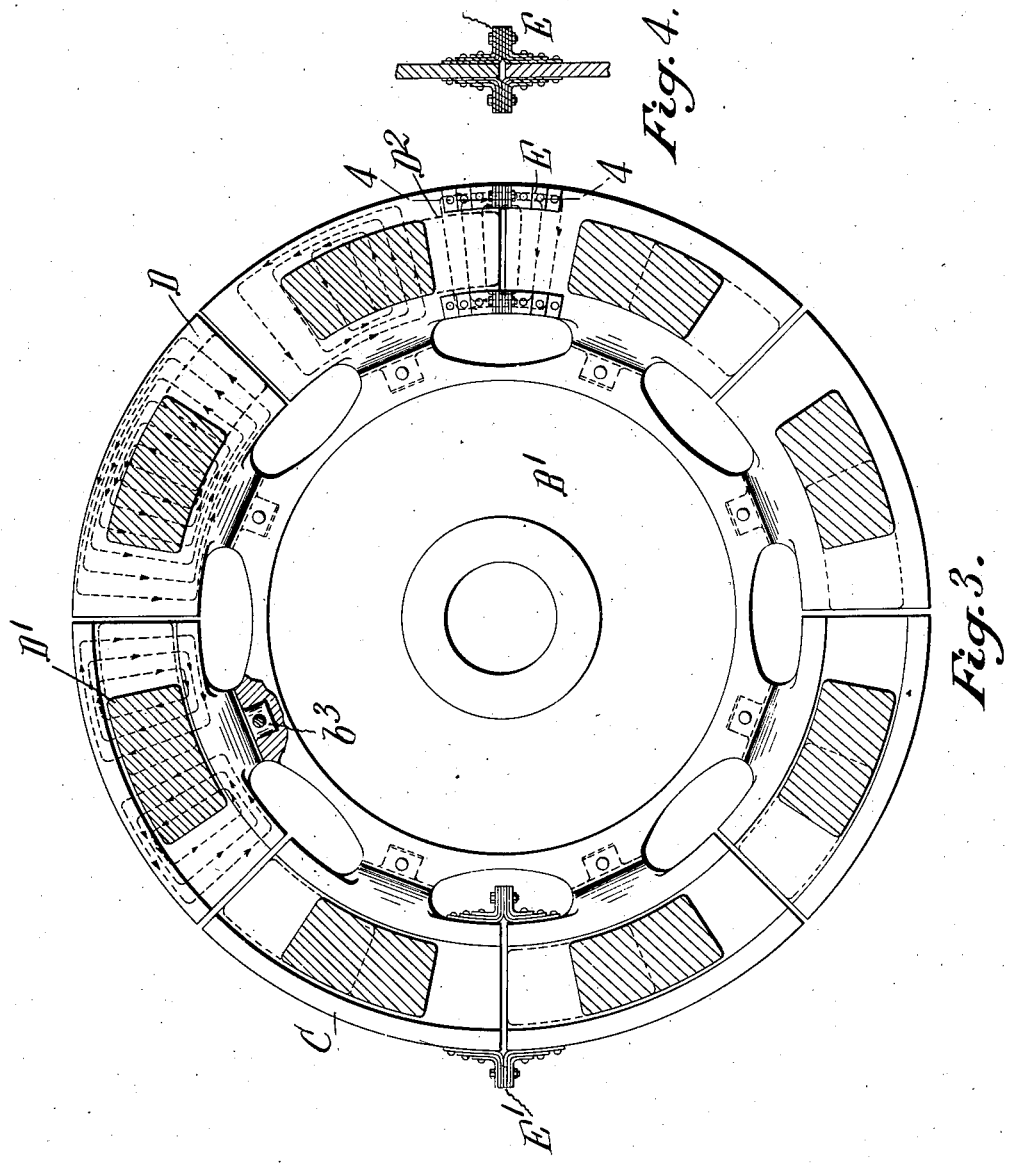

ABRAM P. STECKEL, OF BUFFALO, NEW YORK.

ELECTRICAL CLUTCH AND THE LIKE.

No. 908,707.  Specification of Letters Patent.  Patented Jan. 5, 1909.

Application filed March 23, 1908. Serial No. 422,742.

*To all whom it may concern:*

Be it known that I, ABRAM P. STECKEL, a citizen of the United States, residing at Buffalo, in the county of Erie and State of New York, have invented a new and useful Improvement in Electrical Clutches and the Like, of which the following is a specification.

This invention relates more particularly to electrical induction clutches of that type which comprise two members, one having oppositely disposed magnet poles, and the other a conducting ring or annulus arranged to revolve between said magnet poles in the magnetic field established thereby. The electrical currents induced in said ring or annulus by any relative motion between the same and the magnet poles tend to cause the clutch members to rotate together when one is driven, or to prevent rotation of one member when the other member is held stationary. A clutch of this sort is disclosed in U. S. Letters Patent No. 744,423, granted to me November 17, 1903. These clutches are especially useful in power transmission mechanisms in which the driven part is frequently started and stopped or reversed, and they are also desirable as brakes or retarding devices. The conducting ring or annulus becomes heated and expands in the use of the clutch, and unless provision is made to prevent it, is apt to warp and strike the faces of the magnet poles if the air gap between the poles is small, which it should be to secure the maximum efficiency.

The primary object of this invention is to produce a clutch of this type in which the conducting ring or annulus is constructed so that it has great mechanical strength, adapting it especially for clutches of very large sizes or intended for very heavy work, while at the same time it can expand freely without warping.

Other objects of the invention are to construct the clutch so that the driven member will have the minimum weight consistent with the required strength and power of the clutch, so as thereby to lessen its inertia and enable it to be more quickly started, stopped and reversed; and also to improve clutches of this type in the respects hereinafter described and set forth in the claims.

These objects are accomplished by constructing the conducting ring or annulus of a circular series of segments or sections which are separately secured to the wheel or body supporting the same with intervening spaces between the segments which allow them to expand freely without materially increasing the diameter of the ring or annulus or causing lateral warping or distortion thereof.

The invention is not limited to the particular construction of the driving and driven members of the clutch nor to the particular means employed for fastening the sections of the conducting ring to their supporting wheel or body.

In the accompanying drawings, consisting of two sheets: Figure 1 is a side elevation, partly in longitudinal section, of a clutch embodying the invention. Fig. 2 is an end elevation, partly in transverse section, thereof. Fig. 3 is an end elevation of a modified construction of the driven clutch member showing ring sections of different forms and different fastenings therefor, and also indicating the paths of travel of the electrical currents in the ring in different positions of the magnet poles. Fig. 4 is a fragmentary transverse section thereof in line 4—4, Fig. 3.

Like letters of reference refer to like parts in the several figures.

A and B represent the driving and driven members of the clutch, which are secured to different shafts or are otherwise mounted so that one can turn relative to the other. One clutch member, preferably the driving member A, is provided with oppositely facing magnet poles $a$ $a'$ separated by intervening air gaps, and the other clutch member supports the conducting ring or annulus, which consists of separated sections or segments C of copper or other suitable conducting material arranged in a circular series with spaces between their ends to revolve in the air gaps between the oppositely facing magnet poles.

In the construction shown in Figs. 1 and 2, the driving member A consists of a wheel or circular body and the magnet poles extend inwardly from the rim of the wheel to which they are bolted or otherwise suitably secured, and the poles are excited by separate electrical windings $a^2$ surrounding the several poles. The driven member consists of the conducting ring and a supporting wheel or body composed of a hub $b$ and rim $b'$ joined by opposite thin or sheet metal plates $b^2$ riveted to flanges on the hub and rim. The several sections of the conducting ring or annulus have reduced shanks or necks which extend inwardly therefrom midway between the ends of the segments and are provided with base flanges firmly bolted to the rim $b'$ of the supporting wheel. This construction of the supporting wheel is desirable because it is light and strong, but the wheel could be of any other suitable construction, for instance, of the integral form shown at B' in Fig. 3, and the ring segments can be provided with attaching necks $b^3$ secured in sockets in the wheel, as shown in Fig. 3, or they can be secured to a supporting body in any other suitable manner.

The ring segments shown in Figs. 1 and 2 and in the left hand half of Fig. 3 are of I-shape in cross section but they can be of uniform thickness throughout their width, as indicated in the right hand half of Fig. 3, or of other suitable form. The ring segments being independently secured, are free to expand independently in all directions, and the expansion in the direction of their length, which is the greatest, is allowed without causing lateral distortion by the spaces between their ends. The expansion of the separated segments in a radial direction, or perpendicular to their length, is merely proportional to the radial depth of the segments and is therefore much less than it would be in a solid ring, and the diameter of the sectional ring is not materially increased.

The induced currents in the ring segments flow in paths substantially as indicated by the arrow lines in Fig. 3, and if the ring segments are not electrically connected at their ends the intervening spaces cause the currents to travel over longer paths when the magnet poles are at or near the ends of the segments than when the poles are at or near the middle of the segments, as indicated at D and D', respectively. Therefore, while the segments if not electrically connected will give fairly good results, it is preferable to connect them at their inner and outer edges by conductors which allow the currents to cross the spaces between the segments when the poles are at the ends of the segments, as indicated at $D^2$, Fig. 3, and travel in paths of more nearly equal length in all positions of the poles, which insures a more even pull on the driven member. The conductors should be flexible enough not to interfere with the expansion of the segments and they are conveniently made of copper ribbons or strips secured to the ring segments. When flat-faced segments are used the conductors can be secured to the side faces thereof, as shown at E in Figs. 3 and 4, but when the I-shaped segments are employed the conductors are preferably secured to the inner and outer edges of the segments, as shown at E' in Figs. 2 and 3, where they will not strike the magnet windings.

In the constructions of the clutch shown in the drawings, the ring segments are secured to the outer portion of their supporting member which is located within the sectional ring, while the magnet poles are attached to their supporting member outwardly beyond the conducting ring and the magnet poles are excited by separate electrical windings. This is a desirable construction for large and powerful clutches, for it reduces the weight of the driven member to the minimum and places the greater part of the weight of the driving member at the outer portion thereof, giving an added fly wheel effect thereto. But the conducting ring formed of the spaced segments or sections can also be used in clutches such as disclosed in my said patent, in which the conducting ring is secured to its supporting member outwardly beyond the magnet poles and in which the poles are excited by a common electrical winding. The arrangement of the magnet poles outwardly beyond the conducting ring is also desirable whether a sectional or solid conducting ring is used, so long as provision is made for the expansion of the ring without distortion. The magnet poles are preferably excited electrically, but permanent magnets could also be used for small clutches.

I claim as my invention:

1. A clutch or the like of the character described comprising a member having oppositely arranged separated magnet poles, and a second clutch member provided with a series of separately secured conducting ring segments arranged to revolve between said oppositely arranged magnet poles, substantially as set forth.

2. A clutch or the like of the character described comprising a member having oppositely facing magnet poles separated by air gaps, and a second clutch member provided with conducting ring segments arranged in a circular series with intervening spaces to revolve in the air gaps between said oppositely facing magnet poles, substantially as set forth.

3. A clutch or the like of the character described comprising a member having oppositely arranged separated magnet poles, and a second clutch member composed of a supporting body and a plurality of conducting ring segments separately secured on said body in a circular series with intervening spaces to revolve between said oppositely arranged magnet poles, substantially as set forth.

4. A clutch or the like of the character described comprising a member having oppositely arranged separated magnet poles, and a second clutch member provided with conducting ring segments arranged in a circular series with intervening spaces to revolve between said oppositely arranged magnet poles, and electrical conductors connecting said ring segments, substantially as set forth.

5. A clutch or the like of the character described comprising a member having oppositely arranged separated magnet poles, and a second clutch member provided with conducting ring segments arranged in a circular series with intervening spaces to revolve between said oppositely arranged magnet poles, and flexible electrical conductors which connect said ring segments and allow the independent expansion thereof, substantially as set forth.

6. A clutch or the like of the character described comprising a member having oppositely arranged separated magnet poles, and a second clutch member composed of a supporting body arranged within the circular path of movement of said magnet poles and a plurality of conducting ring segments arranged in a circular series with intervening spaces at the circumferential portion of said supporting body to revolve between said oppositely arranged magnet poles, substantially as set forth.

7. A clutch or the like of the character described comprising a member having oppositely arranged separated magnet poles, and electrical windings for separately exciting said poles, and a second clutch member composed of a supporting body arranged within the circular path of movement of said magnet poles and a conducting ring carried by said supporting body and arranged to revolve between said magnet poles, said second clutch member being constructed to allow the expansion of said conducting ring independently of said supporting body, substantially as set forth.

Witness my hand, this 19th day of March, 1908.

ABRAM P. STECKEL.

Witnesses:
C. B. HORNBECK,
C. W. PARKER.